United States Patent [19]

Zodrow

[11] 4,090,913

[45] May 23, 1978

[54] LABEL TRANSFER SYSTEM FOR A LABELING STATION

[75] Inventor: Rudolf Zodrow, Dusseldorf, Germany

[73] Assignee: Jagenberg-Werke Aktiengesellschaft, Dusseldorf, Germany

[21] Appl. No.: 694,411

[22] Filed: Jun. 9, 1976

[30] Foreign Application Priority Data

Jul. 4, 1975 Germany ............................ 2529872

[51] Int. Cl.$^2$ .......................... B32B 31/00; B65C 9/08

[52] U.S. Cl. ...................................... 156/560; 156/571

[58] Field of Search ................................ 156/560, 571

[56] References Cited

U.S. PATENT DOCUMENTS 3,200,027 8/1965 Fairest ................................ 156/571

*Primary Examiner*—Douglas J. Drummond

*Attorney, Agent, or Firm*—Burgess, Dinklage & Sprung

[57] ABSTRACT

In a label transfer system for picking up a first label from a first station and for affixing it to a moving object at a second station, and comprising a rotating carrier wheel, a first segment on said wheel for carrying a glued label, a rotating carrier for moving objects at said second station, a first rotating pick up and affixing carousel, a first affixing member carried by said first carousel which first member receives said glued label at said first station and upon rotation of said first carousel later affixes said label to a moving object at said second station, the improvement which comprises forming said first carousel so the first affixing member travels an endless oval path including first and second independent arcuate sections each having a respective axis, the first arcuate section being positioned adjacent the first station and the second section being positioned adjacent the second station, and means for pivoting the first carousel about said first axis from a first position to a second position in which the second axis is displaced, the orientation of said first affixing member relative to said first segment being the same in the first and second positions of said first carousel because of the first arcuate section, the orientation of said first affixing member relative to the moving objects at said second station being different in the first and second positions of said first carousel due to the displacement of said second arcuate section, the different orientations corresponding to different diameters of the moving objects at said second station.

8 Claims, 1 Drawing Figure

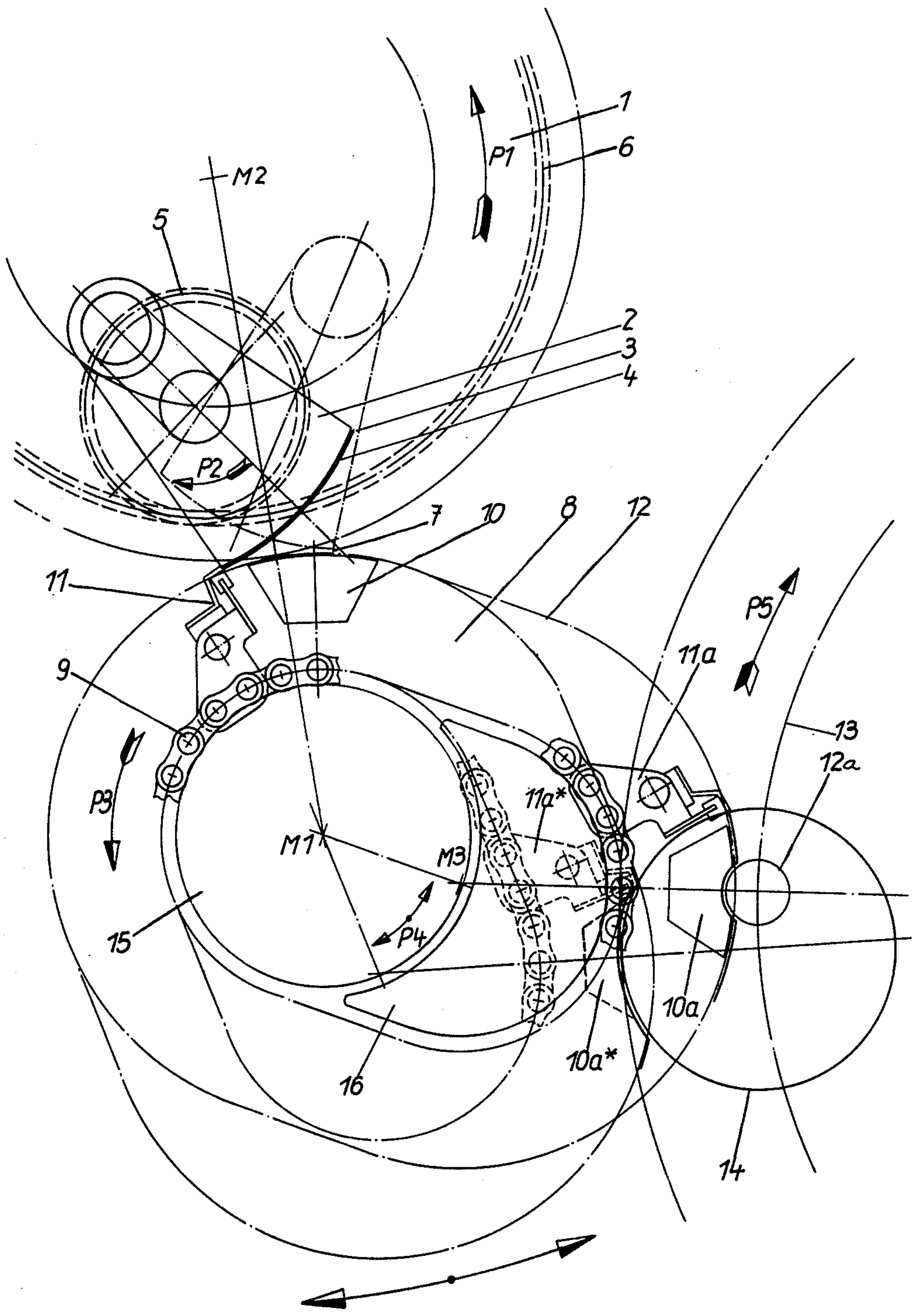
1
6
P1
M2
5
2
3
4
P2
7
10
8
12
11
9
11a
P5
13
12a
11a*
P3
M1
M3
P4
15
10a
16
10a*
14

LABEL TRANSFER SYSTEM FOR A LABELING STATION

BACKGROUND

The invention concerns a label transfer system for a labeling station, especially a gripper cylinder, with a carousel on which there is disposed eccentrically at least one label affixing member, and especially a pair of label affixing members with associated gripper assemblies, which is moved on an arcuate path past a revolving carrier bearing a corresponding number of gluing segments, and on which the gluing segment or segments, which are disposed eccentrically on the carrier and rotate about their own axes, roll as they transfer the label or pair of labels, and which affixes the transferred label or pair of labels as it moves past a revolving object which is advanced on a transport path, especially one which is to be labeled on various diameters.

In labeling machines the affixing of labels to the objects which are to bear them presents certain difficulties inasmuch as the requirement of synchronism between the revolving object and the affixing means during the label affixing operation is not easy to achieve. This is especially true if objects of varying diameter, such as bottles, for example, are to be provided with a breast label and a back label. In the case of a labeling station having gluing segments mounted eccentrically on the carrier and revolving about their own axes, it is necessary, for the achievement of a reliable picking up of the glue-coated labels by the gripper members and the affixing members, that the said gripper members and affixing members move on the same arcuate path in the label transfer area, both for the back label and for the breast label, because the glue segments are able to perform a rolling movement only along this path. The required rolling operation makes it necessary, furthermore, that the speed of movement of the gripper means and affixing members be matched to that of the gluing segments. This speed and the arcuate path, however, are not capable of assuring a rolling movement in the affixing of the labels to begin with. The speed and the arcuate path are optimum with regard to the required rolling movement only for a single diameter of an object rotating at a certain rotatory speed. It is therefore necessary to adapt the speed of the gripper means and affixing members in the area where the labels are transferred to the object to the circumferential speed of the object. This adaptation is especially necessary when one and the same object is to be labeled simultaneously in the area of two different diameters. Whereas it is possible to adapt the circumferential speed and the arcuate path of the gripper means and affixing members to the circumferential speed of the bottle and to the transport path within this area for the label that is intended for the first diameter, without thereby impairing the rolling action of the gluing segments, such adaptation is not possible for labeling the breast of the bottle or the neck of the bottle. In order to label the neck of the bottle, the affixing member would have to be displaced further out in the radial direction. If the rotatory speed is the same for the affixing member which applies the belly label as it is for the affixing member which applies the breast label, this results in a higher circumferential speed; the circumferential speed of the breast or neck of the bottle, on the other hand, is lower than that of the belly of the bottle. Therefore, a still greater relative movement would take place between the affixing member and the breast or the neck of the bottle.

In the awareness of these difficulties, in a known machine the pad for affixing the neck label to the neck of the bottle affixes the label with a slapping movement, so that no rolling movement can occur. This slapping movement, however, not only is expensive to produce, but also it does not guarantee the reliable affixing of the label.

THE INVENTION

The invention is addressed to the problem of creating a label transfer system which can be adapted in a simple manner to a variety of object diameters without resulting in an excessively great relative movement between the surface of the object and the affixing member on the one hand, and on the other hand in an impairment of the rolling action in the area where the labels are taken from the glue applicators.

This problem is solved in accordance with the invention by a label transfer system of the kind described hereinabove, in which the arcuate path of at least one affixing member is a section of closed circuit having a second arcuate section which is displaceable towards the transport path of the objects being labeled, while the center of curvature of the first arcuate path section remains fixed in relation to the axis of rotation of the glue segment carrier.

Since in accordance with the invention it is no longer necessary, when the affixing members are to be made to approach different object diameters, to displace the arcuate path adjacent the glue segment carrier, the adaptation of the path to different object diameters presents no problems with regard to the rolling of the gluing segments on the affixing members. Also, the speed of the movement of the affixing members along the path is not altered by the displacement of the path section adjacent the transport path for adaptation to different object diameters, much less increased for a small object diameter and decreased for a large object diameter. In the case of a pair of label affixing members it remains at the average desirable speed for the labeling of the two different diameters of the object being labeled.

In order to achieve an optimum speed adaptation even at the average speed, the affixing member can be mounted pivotingly such that when it is pressed against the object it rolls on the object, the affixing member thus being accelerated by the frictional engagement of the rotating object to its circumferential speed. To return the affixing member to its starting position, it can be held in its starting position by a spring.

Preferably, where there is one pair of affixing members, the path for the one affixing member is a circular path and the path for the other affixing member is an oval path of which the arcuate section adjacent the gluing segment carrier has a common center of curvature with the circular path, and the same radius. As long as the object is to affix only one label to an object, an adaptation can be achieved even in the case of a label transfer system having affixing members circulating on a circular path. To undertake an adaptation to different object diameters without impairing the rolling action of the glue segments, the label transfer system is pivoted on its center point about the center point of the glue segment carrier, so that the relationships between the glue segment carrier and the label transfer system are not varied, but the circular path is moved either closer to or farther away from the object conveyed on a given transport path. The relationships between the arcuate path section of the oval path and its affixing members on the one hand and the carrier on the other are not changed, either, when the ,enter of the arcuate path section is displaced together with the center of the circular path, so that, overall, the relationships for the rolling action remain unchanged. The arc section adjacent the transport path of the bottles, on the other hand, can be displaced independently of the circular path, for optimum adaptation to the object diameters.

According to a further development of the invention, the affixing members and the gripper members are held by a flexible conveying and holding band, especially a roller chain. For adaptation to different object diameters, the conveying and holding band passes over a cylinder and a crescent-shaped segment which is fitted to the cylinder and is displaceable circumferentially of the cylinder.

The invention will now be further explained with the aid of a drawing representing diagrammatically and in a plan view an embodiment thereof.

The labeling station has a carrier 1 revolving in the direction of the arrow P1, on which gluing segments 2 rotating eccentrically in the direction of the arrow P2 are mounted, which have a convexly curved receiving surface 3 for receiving the labels 4. The gluing segment 2 is mounted to rotate about its own axis located between the convex receiving surface 3 and the center of curvature of receiving surface 3. The rotation about its own axis takes place when the carrier 1 rotates by the rolling of a planet gear 5 on a stationary sun gear 6. On the basis of this arrangement and the mounting, the receiving surface 3 rolls on an arcuate surface 7 of a label transfer device 8. Thereby the gripper assembly 11 with affixing pad 10 picks up the label 4 from surface 3 of the gluing segment 2 which had previously been coated with glue by a gluing cylinder (not shown) and thereby picked up the label when carried past a label box (not shown). If two labels are to be applied simultaneously, the gluing segment 2 has two labels adhering to the glue-coated receiving surface 3 and holds them ready to be received by the label transfer device 8.

The label transfer system has a flexible transport band, i.e. a sprocket roller chain 9, carried along an oval path and bearing at least one affixing pad 10 and the associated gripper assembly 11, and preferably more than one such affixing pad and gripper assembly disposed in spaced relationship thereon. The label affixing pads 10 with the gripper assemblies 11 travel in the direction of the arrow P3 on an oval path having the configuration of an arc in the vicinity of the carrier 1. The center point M1 of this arc is at a constant distance from the axis of rotation M2 of the carrier 1 bearing the gluing segments, and it can be pivoted about the said axis of rotation M2 such that the relationship between gluing segments 2 and affixing pads 10 with gripper assemblies 11 does not change. The oval path 12 has an additional arcuate section with the center point M3. The arcuate section with center point M3 can be pivoted together with the connecting sections about the center point M1 as indicated by the arrow P4. By this pivoting it is possible, without changing the section of arcuate path adjacent carrier 1, to bring the label affixing pads 10*a* out of the position represented in solid lines to the position represented in broken lines. In the farther-extended position, the label affixing pad 10*a* has an optimum attitude towards a small object diameter 12*a* which is advanced on the arcuate path 13 in the direction of arrow P5 while simultaneously rotating about its axis, while the pad 10*a has, in the position represented by broken lines, an optimum attitude with respect to the portion 14 which is substantially larger in diameter but is being advanced on the same path 13**.

A cylinder 15 and an approximately crescent-shaped segment 16, which can be displaced in the direction of arrow P4 on the surface of cylinder 15, serves for the guidance of the roller chain 9.

In the drawing, only that part of the label transfer system comprising the oval path is represented. This part can be, for example, the part for the breast labeling operation. Under this part there is provided, as a rule, a second part in which the label affixing pads revolve on a circular path whose center coincides with center M1 and whose radius is equal to the radius of the arcuate part of the oval path 12 adjacent the carrier 1. If objects such as bottles having both a different back diameter and a different breast diameter are to be labeled with a two-part apparatus of this kind, then it is necessary to adjust both the circular path and the arcuate section having the center point M1 about the center point M2, that is, as a rule, additionally to displace the arc that has the center point M3. In any case it is possible to label many different diameters without running into problems with the rolling of the gluing segments 2 on the label affixing pads 10.

Alternatively, a second carousel may be positioned above the first, each having an oval path and sized and located so as to be simultaneously operable to affix labels to portions of bottles which portions are vertically offset and of different diameters.

It will be appreciated that the instant specification and examples are set forth by way of illustration and not limitation, and that various modifications and changes may be made without departing from the spirit and scope of the present invention.

What is claimed is:

1. In a label transfer system for picking up a first label from a first station and for affixing it to a moving object at a second station, and comprising a rotating carrier wheel, a first segment on said wheel for carrying a glued label, a rotating carrier for moving objects at said second station, a first rotating pick up and affixing carousel, a first affixing member carried by said first carousel which first member receives said glued label at said first station and upon rotation of said first carousel later affixes said label to a moving object at said second station, the improvement which comprises forming said first carousel so the first affixing member travels an endless oval path including first and second independent arcuate sections each having a respective axis, the first arcuate section being positioned adjacent the first station and the second section being positioned adjacent the second station, and means for pivoting the first carousel about said first axis from a first position to a second position in which the second axis is displaced, the orientation of said first affixing member relative to said first segment being the same in the first and second positions of said first carousel because of the first arcuate section, the orientation of said first affixing member relative to the moving objects at said second station being different in the first and second positions of said first carousel due to the displacement of said second arcuate section, the different orientations corresponding to different diameters of the moving objects at said second station.

2. A system according to claim 1, wherein said first affixing member is pivotingly mounted on its carousel so as to roll over an object at the second station during affixing of a label, the system including spring means biased against the pivoting of said first affixing member, whereby after an affixing operation in which said first affixing member pivots said spring means returns said first affixing member to its initial position.

3. A system according to claim 1, including a second rotating carousel having a second affixing member and at least one axis, which one axis coincides with the first axis of said first carousel, the carousels being above one another, the wheel having a second segment vertically offset relative to said first segment for transferring a second label to said second carousel simultaneously with transfer of said first label to said first carousel, in operative position each carousel being adapted to operate on a different diameter of an object at said second station.

4. A system according to claim 3, wherein said second carousel has a circular periphery.

5. A system according to claim 3, wherein said second carousel has an oval periphery and first and second arcuate sections with respective axes.

6. A system according to claim, 1, wherein the carousel includes a flexible transport band moving about said oval path, and means connecting said affixing member to said band and causing said member to travel said oval path.

7. A system according to claim 6, wherein said band comprises a sprocket roller chain.

8. A system according to claim 6, wherein said carousel includes a cylinder rotating about said first axis and a crescent-shaped projection fitted to said cylinder, said cylinder and projection constituting the first and second arcuate sections and together making up the oval path.

* * * * *